(No Model.)
W. PIERCY.
FILTER.
No. 308,792.
Patented Dec. 2, 1884.
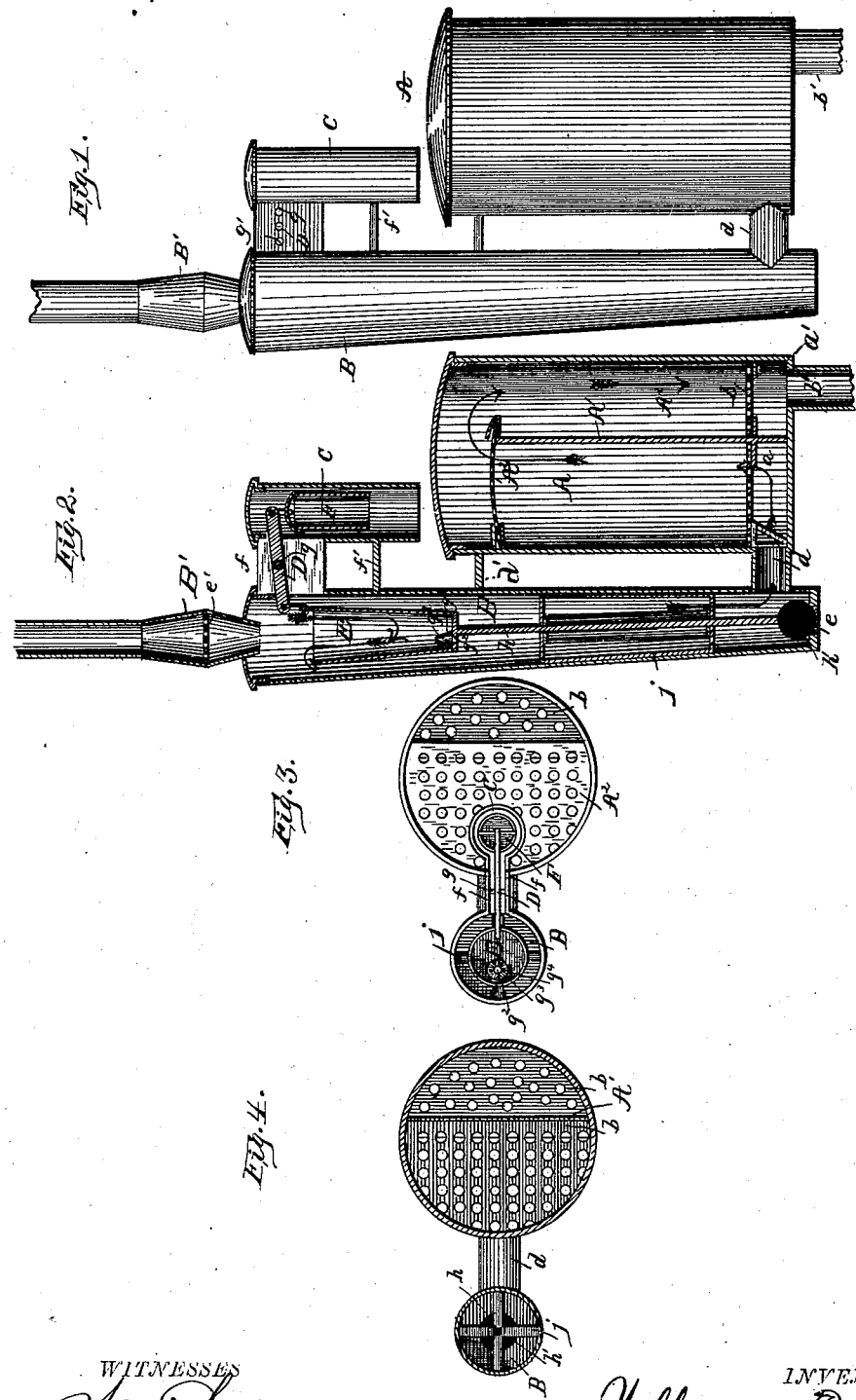
WITNESSES
INVENTOR
William Piercy
By Myers & Co
Attorneys

UNITED STATES PATENT OFFICE.

WILLIAM PIERCY, OF CARTHAGE, MISSOURI.

FILTER.

SPECIFICATION forming part of Letters Patent No. 308,792, dated December 2, 1884.

Application filed April 30, 1884. (No model.)

*To all whom it may concern:*

Be it known that I, WILLIAM PIERCY, a citizen of the United States of America, residing at Carthage, in the county of Jasper and State of Missouri, have invented certain new and useful Improvements in Filters, of which the following is a specification, reference being had therein to the accompanying drawings.

This invention has for its object, primarily, to store and purify rain-water and river-water to render them suitable for drinking and domestic purposes, to effect the automatic feeding and cutting off of the water, to obviate the clogging of the waste-water outlets, and to permit the ready cleaning of the appliance of sediment.

The invention consists of the combinations of parts and their construction, substantially as hereinafter more fully set forth, and pointed out in the claims.

In the accompanying drawings, Figure 1 is a side view of my improved rain-water cut-off and filter. Fig. 2 is a sectional elevation thereof. Fig. 3 is a plan view, and Fig. 4 is a horizontal section, of the same.

In the organization of my invention I employ a vessel or receptacle, A, preferably cylindric in cross-section, which, together with a subdividing vertical partition, A', arranged or fixed therein near one side, with its lower end resting upon the bottom of said cylinder, and with its upper end connected to the more remote sides of said cylinder by a foraminated or perforated plate, $A^2$, constitutes the filter, the same containing charcoal or other suitable filtering and purifying medium.

In the arrangement of filtering materials charcoal is preferably introduced in the inclosure formed by the vertical partition A' and the perforated horizontal plate $A^2$, and charcoal, or charcoal and fine gravel in layers, may be arranged, in the order named, from top to bottom in the adjoining vertical section formed by the partition A', and in the apartment $a'$ sponge is introduced, and these materials may be removed and replaced when desirable.

Within the smaller or discharge water-chamber $a'$ of the cylinder A, near the bottom, is a perforated or foraminated diaphragm, $b$, while in the bottom of said chamber is the water-discharge outlet $b'$, which is prevented from being clogged by pieces of coal or of other filtering material that may be used and that may float off with the water overflowing the filtering-chamber by means of said diaphragm, as will hereinafter more fully appear.

B is a pipe-shaped tapering receptacle with one (its lower) end secured to the lower end of the cylinder A by a pipe-connection, $d$, communicating with the filtering-chamber, while in order to firmly secure it in position it is further secured to said cylinder at $d'$, near the upper end of the latter. The lower end of the receptacle B is apertured or provided with a waste-water outlet, $e$.

B' is a double conically-ended removable pipe-section, which is adapted to fit at one end into an aperture of the cover of the receptacle B, and to receive at its other end the rain-water spout of the building to conduct the water into said receptacle. Intermediately of the ends of said pipe-section, upon its inside, is secured a perforated diaphragm, $e'$, to prevent clogging substances entering the receptacle. The pipe-section, in order to permit the ready cleaning of the lodged substances or sediment therein, may be readily removed.

Affixed to the receptacle B, so as to stand a short distance therefrom, (it may be by parallel plates $ff$ at the upper end, and at the lower end by an arm, $f'$,) is a short cylinder, C, which need not be of as great diameter as receptacle B, and between which parallel plates is pivoted or hung a lever, D, a pin, $g$, inserted through the middle or intermediate one of a number of apertures, $g'$, in said plates and an aperture in said lever, forming the fulcrum therefor.

Within the receptacle B, and suspended from one arm of said lever, is a cylindric bucket, E, being slightly tapering toward its lower end, while within the cylinder C, suspended from the other arm of said lever D, is a weighed bucket, F; or in lieu thereof a simple weight may be used, the only purpose or function thereof being purely to counterbalance the bucket E when the supply of water is cut off, as will more fully appear farther on.

In the bottom of the bucket E is a waste-water outlet, $g^2$, while covering said opening or outlet, upon the inside of the bucket, is a conical guard, $g^3$, having a series of slots, $g^4$, extending from its base upward, the object of which, while protecting said outlet or preventing it from being clogged by foreign substances or sediment, is also to provide numerous passages to the outlet, to more effectually prevent the possibility of the stopping up of the outlet. The bucket E has affixed to its lower end or bottom a stem or rod, $h$, which has a tapered valve or plug, $h'$, secured to its lower end, said plug or valve fitting in the waste-water outlet or aperture $e$ in the bottom of the receptacle B. Upon the valve stem or rod $h$ is loosely fitted a four-armed frame or spider, $j$, to effect the holding of the valve-stem, with its valve, centrally of said outlet, to insure the seating of the valve when lowered to its place or seat.

By means of the additional holes or apertures in the parallel plates, between which the lever is fulcrumed, its fulcrum-pin, after having been withdrawn from the central aperture, may be inserted in either of the other two apertures, whereby the lever may be so held as to lock the valve of the receptacle B either in an open or closed position.

It will be seen that the lever, with both the attached weight and the valve-operating bucket, including the valve and stem, with the guide-frame or spider, can all be readily removed to permit the cleaning of the same, or for other purpose.

In operation it is obvious that, upon the passage of the water (during a rain-fall or storm, for instance) from the rain-water spout through the pipe-section B' into the receptacle B, the water will first enter the bucket E, overcoming the weight or bucket F, which will allow the valve or plug $h'$ to close the normally-open aperture $e$ in the bottom of said receptacle. The continued flow of water will fill and overflow the bucket E, the overflow-water entering the receptacle B proper, whence the overflowing water will pass through the pipe-connection $d$ and enter and rise in the filtering-chamber of the cylinder or vessel A. The water rising in said chamber will be purified, as aforesaid, to render it suitable for drinking or domestic purposes, while the overflowing portion from said chamber will enter the sub-chamber $a$ and escape, after having been deprived by the diaphragm $b$ of any coal or other filtering medium that may have floated off with it, through the outlet $b'$ of said sub-chamber $a$, into a suitable storm-receptacle for use. This circulation or supply passage and discharge of the water, together with its filtration, will continue during the rain-fall or storm or until arrested, which can be done at any time by locking the valve or plug $h'$ open in the manner above described, and allowing, after having secured all that is needed, the rest to be discharged through the waste-water outlet $e$ of the receptacle B. After the rain-fall, (the valve $h'$ not being locked,) the water remaining temporarily in the bucket E will finally pass off through its outlet $g^2$ into the receptacle B and allow the weight or bucket F to counterbalance the bucket E, when the plug or valve $h'$ will be elevated out of the aperture $e$, and permit the water to escape therefrom, together with the water backing therein from the filter, until the same has been entirely emptied.

The chamber $A^2$ is also a very convenient receptacle for ice, which may be placed therein (the charcoal being removed in part) for cooling the water, and thus the filter may be made to combine therewith all the advantages of both a filter and water-cooler.

Having thus fully described my invention, what I claim, and desire to secure by Letters Patent, is—

1. In a filter, the combination of the receptacle B, having inlet-pipe section B' and water-outlet $e$, lever D, adjustable by pin $g$ in apertures $g'$, and secured by spider $j$, bucket E, having stem or rod $h$, integral with valve or plug $h'$, and conical guard $g^3$, having slots $g^4$, and weighted bucket F in cylinder C, substantially as shown, and for the purpose described.

2. The cylinder A, having perforated diaphragm $b$, perforated plate $A^2$, and outlet $b'$, in combination with receptacle B, having pipe-connection $d$, bucket E, having stem or rod $h$, held by spider $j$, and having valve or plug $h'$ to close apertures $e$, and guard $g^3$, having slots $g^4$, and lever D, adjustable by pin $g$ in apertures $g'$, substantially as shown, and for the purpose described.

In testimony whereof I affix my signature in presence of two witnesses.

WILLIAM PIERCY.

Witnesses:
 JNO. A. McGILL,
 H. A. HALL.